United States Patent
Stigsson et al.

(10) Patent No.: US 8,735,637 B2
(45) Date of Patent: May 27, 2014

(54) CONVERSION OF CRUDE TALL OIL TO RENEWABLE FEEDSTOCK FOR DIESEL RANGE FUEL COMPOSITIONS

(75) Inventors: Lars Stigsson, Bjärred (SE); Valeri Naydenov, Luleå (SE)

(73) Assignee: Sunpine AB, Pitea (SE)

( * ) Notice: Subject to any disclaimer, the term of this patent is extended or adjusted under 35 U.S.C. 154(b) by 888 days.

(21) Appl. No.: 12/937,762

(22) PCT Filed: Mar. 31, 2009

(86) PCT No.: PCT/SE2009/000165
§ 371 (c)(1),
(2), (4) Date: Nov. 17, 2010

(87) PCT Pub. No.: WO2009/131510
PCT Pub. Date: Oct. 29, 2009

(65) Prior Publication Data
US 2011/0049012 A1   Mar. 3, 2011

Related U.S. Application Data

(60) Provisional application No. 61/071,273, filed on Apr. 21, 2008.

(51) Int. Cl.
*C07C 1/00* (2006.01)
(52) U.S. Cl.
USPC ............................. 585/240; 585/242; 44/605
(58) Field of Classification Search
CPC .............. C10G 3/42; C10G 3/46; C10G 3/49; C10G 7/06; C10G 45/00; C10G 45/06; C10G 2300/10; C10G 2300/1011; C10G 2300/1014; C10G 2300/301; C10G 2400/04; Y02E 50/30; Y02E 50/14
USPC ..................... 585/240, 242; 44/605
See application file for complete search history.

(56) References Cited

U.S. PATENT DOCUMENTS

| | | | |
|---|---|---|---|
| 3,644,179 A | 2/1972 | Knoer et al. | |
| 3,926,936 A * | 12/1975 | Lehtinen | 530/208 |
| 4,151,160 A * | 4/1979 | Koebner | 530/209 |
| 4,992,605 A | 2/1991 | Craig et al. | |
| 5,705,722 A | 1/1998 | Monnier et al. | |
| 7,501,546 B2 * | 3/2009 | Koivusalmi et al. | 585/327 |
| 7,982,076 B2 * | 7/2011 | Marker et al. | 585/240 |
| 8,053,614 B2 * | 11/2011 | Aalto et al. | 585/1 |
| 8,471,081 B2 * | 6/2013 | McCall | 585/240 |
| 2006/0264684 A1 | 11/2006 | Petri et al. | |
| 2007/0130820 A1 * | 6/2007 | Chatterjee et al. | 44/306 |
| 2008/0308458 A1 * | 12/2008 | Dindi et al. | 208/137 |
| 2009/0056201 A1 * | 3/2009 | Morgan | 44/308 |
| 2009/0217573 A1 * | 9/2009 | Stigsson | 44/388 |

FOREIGN PATENT DOCUMENTS

| | | |
|---|---|---|
| EP | 1 741 768 A1 | 1/2007 |
| GB | 1023309 A | 3/1966 |
| JP | 52-039613 A | 3/1977 |
| JP | 2000-219891 A | 8/2000 |
| JP | 2000-226595 A | 8/2000 |
| WO | 2006/032670 A1 | 3/2006 |
| WO | 2006/111997 A1 | 10/2006 |
| WO | 2007/050030 A1 | 5/2007 |

OTHER PUBLICATIONS

International Preliminary Report on Patentability; Appln PCT/SE2009/000165.
International Search Report: PCT/SE2009/000165.
Supplemental European Search Report dated Jul. 12, 2012; EP 09 73 4835.

* cited by examiner

*Primary Examiner* — Nina Bhat
(74) *Attorney, Agent, or Firm* — Ladas & Parry LLP

(57) ABSTRACT

A method for converting crude tall oil into high quality diesel fuels include the steps of (a) removal of non-oil contaminants present in the crude tall oil and recovery of valuable organic, (b) heating and removing the volatile fractions of the refined tall oil stream from step (a) and forming a volatiles free oil stream comprising organic components with boiling points of 170° C. and higher, (c) vacuum distilling the volatiles free oil stream of from step (b) to produce a first and second stream the first stream including components with boiling points between 170-400° C. and the second stream comprising components having boiling points greater than 400° C. and (d) passing the first stream into a catalytic reactor wherein hydrogenation and deoxygenation take place to produce a diesel range fuel depleted in oxygen.

23 Claims, No Drawings

CONVERSION OF CRUDE TALL OIL TO RENEWABLE FEEDSTOCK FOR DIESEL RANGE FUEL COMPOSITIONS

FIELD OF THE INVENTION

The present invention relates to the conversion of crude tall oil to renewable diesel fuels in high yield suitable for direct use in engines or for final treatment by hydrogen to make low sulfur diesel range automotive fuel compositions. The present invention further relates to the efficient removal of alkali, alkali earth metal salts/soaps, fibers/foreign matter and lignin compounds from crude tall oil. Moreover, the present invention relates to the removal of volatile and high-boiling point fractions from crude tall oil.

BACKGROUND TO THE INVENTION

The importance of bio-fuels for transport has become more and more important in the past years and this trend is expected to continue. The main reasons are following i) depletion of crude oil reserves and significant increases in crude oil prices ii) increased environmental awareness particularly relating to emission of greenhouse gases iii) energy supply security.

Replacement of fossil fuels for automotive transport is one of the most critical areas closely related to reduction of greenhouse gas emissions. Among the fuels used for internal combustion engines, more than 700 million tons of diesel fuel was consumed in 2006. Diesel fuel demand is predicted to grow to 900 million tons by 2020. The share of diesel range fuels based on renewable feedstock's (biodiesel, gas-to-liquid (GTL) and green diesel) was only about 2% in 2006.

New legislation passed during 2007 calls for substantial increase in the proportion of renewable automotive fuels by 2020. Novel processes for conversion of biomass to automotive fuels are developed worldwide, however technological break-throughs are needed to reach the desired economics and life cycle efficiency goals. In the context of ways to reduce the use of fossil fuels, one approach has gained considerable attention and involves conversion of various vegetable oils to automotive fuels. Typical strategies in materializing this approach involve (i) transesterification route to obtain fuel composition often referred to as Biodiesel and (ii) hydrogenation route to obtain fuel composition often referred to as renewable diesel.

At present transesterification route has been demonstrated on commercial scale throughout the world. Within transesterification route, the vegetable oils with typical examples being palm oil, soybean oil and canola oil are reacted with methanol or other low-molecular weight alkyl alcohol to form fatty acid methyl ester (FAME) type Biodiesel fuel. The Biodiesel fuel obtained via transesterification route often referred to as "first generation biofuel", however, suffers from several drawbacks including (i) competition for raw materials typically utilized in food applications, (ii) deforestation in tropical countries and (iii) issues related to diesel engine performance.

While the first two drawbacks concern serious moral issues, the later drawback, namely issues related to the engine performance, has proven to be a major obstacle from practical point of view in establishment of Biodiesel as fossil diesel alternative. Typical problems when Biodiesel fuels of FAME type have been used in diesel engine include: (i) deposits throughout the fuel and combustion systems, (ii) problems related to the poor cold-flow properties of FAME, (iii) low stability towards heat and oxidation, (iv) prone towards water absorption, (v) higher emissions of NOx relative to fossil type diesel and (vi) shortening of engine oils lifetime, etc. These problems can be eliminated if the vegetable oils or FAME type biofuels are treated at oil processing plants under hydrogen rich conditions (hydrogenation) alone or in combination with mineral oil fractions. Using the hydrogenation route, paraffin, iso-paraffin and cyclo-alkane rich fuels with excellent properties for direct use in modern diesel engines can potentially be produced. For example, the National Resources Canada (NRCan) has developed a process for the catalytic hydrogenation of vegetable oils over conventional NiMo/Al2O3 and CoMo/Al2O3 catalysts. Although, the biogas oil products of this process purportedly have cetane numbers in the range of 70-90, the yield of desired diesel range hydrocarbons is lower than about 60%. The by-products obtained during this catalytic hydrogenation are carbon oxides, short chain hydrocarbons, gasoline range hydrocarbons and very heavy high boiling hydrocarbons.

The notation "diesel range feedstock/fuel" in here is to be understood hydrocarbons and their oxygenated derivatives boiling in the range 170-400 degrees C.

While edible vegetable oils are used in food applications and are available in limited quantities only, other non-edible raw materials" would be suitable feedstock for the production of diesel range hydrocarbons. Processing of such raw materials is more extensive and involves fundamental changes in the properties within the comprising components and hence these raw materials and corresponding fuel products are often referred to as "second generation raw materials for biofuels and second generation biofuels", respectively. A suitable example for such raw material comprising C14-C24 oxygenated hydrocarbons is crude tall oil. Crude tall oil is a viscous yellow to dark brown odorous liquid obtained as a by-product of Kraft process within wood pulp manufacture. The name originated as Anglicization of Swedish word "tallolja" ("pine oil").

Crude tall oil, in the following CTO, contains unsaponifiable fraction (10-40 wt. %) and acidic fraction. The acidic fraction can be further sub-divided into diterpenic (rosin) carboxy-acids with general formula C20H30O2 (mainly Abietic acid and its isomers) and fatty acids ranging C14-C24 (principle components being Linoleic acid, Oleic acid, Linolenic acid and Palmitic acid i.e. C18 and C16). The unsaponifiable fraction comprises of fatty alcohols (C20-C24), some sterols (C30), and various other alkyl- and cyclo-alkyl hydrocarbon derivates (C10-C30). The acidic fraction of crude tall oil along with certain components comprising the unsaponifiable fraction is of particular interest in view of conversion to diesel fuel for direct use in engines or as high-quality feedstock suitable for the production of diesel range fuel compositions. Nowadays fractional distillation of CTO produces tall oil rosin and tall oil fatty acids (TOFA). The rosin finds use as a component of adhesives, rubbers, inks, and emulsifiers, whereas tall oil fatty acids find use in the production of soaps and lubricants.

Crude tall oil, however, as being by-product stream contains a long list of contaminants. Typical CTO contaminants that need to be mentioned include alkali salts, alkaline earth metal salts, solubilised iron, sulfur and sulfur-containing organic compounds, cellulosic fibers and large organic lignin compounds with molecular weights well over 1000 units.

There is direct relation between the amount of entrained black liquor material in CTO and the CTO contaminants and in particular between black liquor content and levels of lignin, fibers/foreign matter, sodium and calcium salts as well as calcium resinates and fatty acid calcium soaps. The acidulation of tall oil soap (tall oil precursor) with sulfuric acid at pulp mills does not entirely convert calcium resinates and fatty acid calcium soaps into their corresponding acid forms and calcium sulphate. Therefore, significant quantities of calcium remain in the CTO, in the order of several hundred ppm up to several thousand ppm. A large portion of the ash in CTO is calcium bound in soaps/resinates. Another major contaminant within CTO is lignin of varying fragment lengths. Lignin is a large and complex phenolic polymer that to a certain extent dissolves in the crude tall oil in the form phenolic fragments of varying molecular weight. The lignin content within CTO may vary between few hundred ppm in well acidulated and subsequently separated CTO to up to 10 000 ppm (or higher) for poorly acidulated and/or separated crude tall oils. Fibers are fine cellulose in nature entities not recovered within the wood pulp manufacturing. Typical fiber levels in CTO are 0.3-0.5 percent by weight. Yet another typical CTO contaminant is iron. Most often iron quantities are leached from non-protected surfaces of tanks, pipes, etc. which have been in contact with crude tall oil, especially at prolonged exposure. The leaching is largely promoted by the sulfuric acid entrained within the crude tall oil. The common feature of all these contaminants is that they have detrimental effect on the various catalyst utilized at oil refineries. In view of the CTO potential as second generation diesel fuel or as second generation feedstock for biofuel compositions these contaminants should preferably be removed from the CTO prior any direct use or catalytic upgrading.

The CTO contains various amounts of sulfur compounds ranging from about 500 ppm up to several thousand ppm. The sulfur compounds include a wide range of organic and inorganic sulfur compounds including sulphate, sulfite, polysulfide, elemental sulfur, mercaptans, organic sulfides and organic sulfones and sulfonates. Whereas some sulfur functionalities (—SH, —S—S—, —$SO_x$, where x index can be 2, 3 and 4) are connected to both fatty and diterpenic moieties comprising the crude tall oil, most of the sulfur is concentrated into the CTO volatile fraction and to lower extend into the high boiling point fraction of CTO.

Crude tall oil has been proposed as a source of raw material suitable for the production of components boiling in the diesel range when processed via hydrogenation route in an existing hydroprocessing plants. However, the presence of various contaminants described above within CTO, have led to fast catalyst deactivation and undesired low yield of diesel range hydrocarbons. It is recognized that in particular sodium, calcium, fibers and lignin contaminants of CTO will shorten the life length of hydrogenation catalysts. Among these, catalyst coking, plugging and catalyst sites poisoning are major consequences caused by the presence of CTO contaminants.

Depitched tall oil, traditionally produced by a single evaporation stage performed on crude tall oil in a thin film evaporator, has been proposed as a feasible feedstock alternative for the production of diesel range fuels via a hydrogenation route. Traditional depitching is performed at high temperature (above 250 degrees C.) in one evaporative step resulting in that a large portion of the diesel range molecules are lost with the pitch. Furthermore high boiling compounds are entrained into the product distillate. Therefore more efficient separation procedures are needed if the product should be used as a diesel fuel or used as a feed to hydrogenation plants for production of high-quality diesel range products in yields above about 80%.

Clearly, the crude tall oil contains fractions of undesirable compounds that need to be either removed or converted before it can be used efficiently as a fuel or as a feed to hydroprocessing plants for production of diesel range fuel compositions.

We have discovered that crude tall oil can be converted into a high-quality diesel fuel or renewable feedstock for hydroprocessing plants (in the following Second Generation Crude Tall Diesel (SGCTD)) in very high yield suitable for use in hydrotreating-type processing units, wherein the SGCTD feedstock is treated with hydrogen to form low sulfur content diesel range fuel compositions. Optionally as described in the method of present invention, the SGCTD feedstock can be depleted of oxygen by decarboxylation/decarboxylation prior to or during a hydrotreating step.

SUMMARY OF THE PRESENT INVENTION

The main objective of the present invention is to convert crude tall oil to high-quality diesel fuel by an efficient purification process optionally followed by deoxygenation and/or hydrogenation. A further objective is to provide an efficient means for the removal of alkali, alkali earth metal salts/soaps, fibers/foreign matter and lignin compounds from crude tall oil. Moreover, according to the method of the present invention, there is provided an efficient means for the separation of a pure diesel range distillate from high-boiling point fractions present in the crude tall oil.

The present invention discloses an innovative sequence of reaction and separation steps enabling the production of high-quality diesel in high yield from crude tall oil. The high yield is attained by recovering substantially all valuable diesel range boiling components present in the crude tall oil and selecting processing steps that avoid formation of undesired products.

The present invention thus provides a method for conversion of crude tall oil into high-quality renewable diesel fuels compositions comprising the steps of: (i) removal of non-oil contaminants present in the CTO; (ii) removal of tall oil volatile fraction; (iii) removal of the high boiling point components present in the CTO by distillation to obtain well defined process stream (SGCTD) comprised of components with boiling points in the range of 170-400 degrees C.; (iv) lowering the oxygen content of the SGCTD stream via a combination of decarboxylation/decarbonylation.

According to one specific embodiment of the present invention, there is provided a method for conversion of crude tall oil into a renewable diesel fuel composition by a sequence of reaction and separation steps characterized in that the method comprises the steps of:
  a) Removal of non-oil contaminants present in the crude tall oil and recovering valuable organic compounds present in the crude tall oil, thereby forming a refined tall oil stream;
  b) Removal of the volatile fraction of the refined tall oil stream from step a), thereby forming a volatiles free oil stream comprising organic components with boiling points, at atmospheric pressure, of 170 degrees C. or higher;
  c) Separation in a vacuum distillation column of the volatiles free oil stream of step b) into two process streams or phases wherein a first process stream or phase is substantially comprising components with boiling points, at atmospheric pressure, in the range of 170-400 degrees C. and a second process stream or phase is substantially comprising components with boiling points, at atmospheric pressure, over 400 degrees C.;
  d) Passing the first process stream or phase substantially comprising components with boiling points, at atmospheric pressure, in the range of 170-400 degrees C. through a catalytic bed comprised of deoxygenation catalyst at elevated temperature, thereby forming a diesel range fuel depleted in oxygen.

Further embodiments of the present invention are described in the following description and the appended dependent claims.

DETAILED DESCRIPTION OF THE INVENTION

The inventors of the present invention have discovered a new and efficient method for conversion of crude tall oil to high-quality renewable diesel.

As received crude tall oil by-product stream from Pulp & Paper mills is utilized as feed in all aspects of the process of the present invention.

Crude tall oil stream is obtained as by-product stream within pulp manufacturing, typically via Kraft-type process. The CTO is comprised of lipophilic type extractives present in wood. Thus, during wood cooking, these extractives are solubilised to their corresponding alkali salt forms along with other wood components prone to reaction with the strong alkali liquor added to wood, for example lignin. The utilized cooking liquor, often referred to as Black Liquor, is thereafter separated from the cellulosic pulp and subjected to a series of evaporation steps in order to reduce its water content. At certain dry content levels of black liquor, the lipophilic extractives naturally separate and float to the top of the process vessel, where with help of suitable unit arrangement they are skimmed-off to form stream often referred to as crude tall oil soap. The tall oil soap is further transferred into a separate tank, where additional portion of black liquor is allowed to separate. However, the very last portion of black liquor is practically impossible to separate from the tall oil soap. The reason for this behavior lies in the largely inhomogeneous nature of the tall oil soap, which is essentially concentrated surfactant stream. The principle components i.e. fatty acid soaps and alkali resinates combine both hydrophilic and hydrophobic molecular parts thus forming micelles, lamellas and other large tridimensional entities which are able to retain various hydrophilic or hydrophobic components within the entity and/or in the space between entities. Thus, a number of (i) hydrophobic components exemplified by the various unsaponifiable extractives as well as (ii) hydrophilic black liquor are retained by the tall oil soap.

The tall oil soap is acidulated in subsequent process step, where the fatty acid soaps and the alkali resinates are converted into their acidic forms, namely free fatty acids, resin acids and stochiometric amount of inorganic salt is co-generated. The acidulation is carried out in various types of reactor vessels at elevated temperatures, where the tall oil soap is combined under intensive agitation with a concentrated acid which reduces the pH to about 3. Thereafter, the obtained mixture is allowed to separate into an oil phase (tall oil) and a brine aqueous solution, typically in High Density Separator (HDS) unit. The separation of the oil and aqueous phases is often hindered by the presence of so called rag layer in-between typically comprised of lignin fragments. The oil separation from the aqueous brine and the lignin is essential for the tall oil quality.

Within the first step of present invention, the CTO stream is treated via series of reactions and separations steps, where the non-oil contaminants present in the crude tall oil are removed to obtain a refined tall oil stream. In addition, valuable tall oil components are recovered from their inferior forms and rendered available for utilization as SGCTD feedstock thus substantially increasing the yield of SGCTD feedstock.

Crude tall oils obtained after separation in HDS have lower contaminant levels due to the more effective separation but nevertheless contain all contaminants mentioned earlier contributed by the black liquor. Crude tall oils of very poor quality are obtained when separated in regular tanks through separation/decantation. Thus, in general, the crude tall oil is contaminated with alkali salts, fibers and lignin all originating from the black liquor entrained initially in the tall oil soap and thereafter in the CTO itself.

Whereas contaminants with black liquor origin can be somewhat decreased by thorough separation steps in an existing equipment either on tall oil soap or on the obtained tall oil, the calcium soaps and calcium resinates are not addressed up to now by any treatment within the CTO production. It is obvious however that these inferior forms of fatty and resin acids, namely calcium soaps and calcium resinates, concern tall oil components which are of interest for the production of SGCTD feedstock and hence if not recovered may substantially decrease the SGCTD yield. The main reason for their presence in the produced CTO is the higher stability of these salts relative to the corresponding sodium salts which also governs their ability to survive the moderate acidic conditions used within the CTO production, typically pH of about 3 is targeted. The stability of calcium soaps and calcium resinates is a consequence of the strong complexation affinity of calcium towards carboxylic type functional groups such as fatty and resin acid functionalities (both containing —COOH). Further, calcium soaps and calcium resinates are very sticky by nature and tend to deposit on various metal surfaces e.g. pipes, tanks, pumps, etc. Such deposits are nearly impossible to be removed by washing thus leaving the only available option i.e. manual mechanical removal. In addition, as being salts they are not prone to any physical refining, where typical example is being distillation.

Again, it is clear that if the CTO is not treated in respect to the calcium soaps and calcium resinates they will be removed along with the other contaminants from the oil thus loosing valuable components for the SGCTD feedstock. An option, which would recover those soaps and resinates, is an acid wash step, which can be directly applied on the CTO. As received CTO stream (from pulp mills) is subjected to a washing step where strong mineral acids are used to lower the pH less than 3. Especially suitable acids for this application are sulfuric and phosphoric acids due to their strong affinity towards calcium. This strong affinity is governed by the ability to produce inorganic salts with very low solubility constants, $CaSO_4$ and $Ca_2(PO_4)_3$, respectively upon their reaction with calcium. Thus, the fatty acid soaps and resinates are converted to the corresponding fatty acids and resin acids, whereas calcium is bound in form of inorganic salt of very low solubility. The washing acids can be applied from concentrated form to highly diluted acid solution. However, acids spiked with water are preferred in order to avoid carbonization of the organic material. In a typical washing procedure, the CTO stream is vigorously mixed with strongly acidic stream, where the strong mixing ensures maximum contact between the two streams. Thereafter, the obtained mixture is allowed to separate. The washing and separation are preferably performed at elevated temperatures which facilitates both mixing and separation. Optionally, the oil stream is subjected to a water wash in order to remove any inorganic acid entrained within the tall oil. In cases when sharp separation is achieved after the acid wash, the optional water wash is not practiced. Other inorganic acids hydrochloric, nitric, etc., are also suitable for the recovery of the calcium soaps and calcium resinates in sense that they are able to substantially decrease the operating pH levels. However, an environmental concern towards chlorides and nitrates makes them unattractive option when practicing the present invention.

Therefore, according to one specific embodiment of the present invention the step a) is achieved by washing crude tall oil with sulfuric acid, phosphoric acid or a mixture thereof. The other option available for the liberation of fatty and resin acids comprising calcium soaps and calcium resinates involves utilization of various heterogeneous systems which either (i) substantially decrease the pH or (ii) have strong affinity towards calcium. Further, those heterogeneous systems can be sub-divided into inorganic and organic types. The inorganic type systems suitable for use within present invention are various natural or synthetic clays, minerals, zeolites, etc. which offer strong acidic centers. The presence of such centers typically manifests itself by providing the material with ion exchange properties. The other type of inorganic systems suitable for use within present invention, concerns the materials which have their properties tailored for this specific application. For example, inorganic supports typically offering relatively high surface area are modified in terms of creating well defined acidic centers through adsorption, grafting, etc. Especially suitable materials from this group are inorganic supports, where acidic centers are various strongly acidic functionalities, typical example being sulfonic group ($-SO_3H$).

The organic type systems suitable for use within present invention are polymer based cation exchanger resins and especially suitable are the strong cation exchange resins. Typically, the cation exchange resins comprise of an inert porous polymeric matrix functionalized with the suitable functional group that has mobile ion, in this case cation. Acidic forms ($H^+$) of these cation exchangers are preferred when practicing the present invention. Another type of organic systems suitable for use within present invention is the so call chelating resins. The difference compared to the ion exchange resins is their functional group which is a group with excellent ligand properties. The chelating resins typically are designed to target various metal cations where the cations are retained through a coordination type interaction between resin functional group and metal cation. Yet another type of organic system suitable for use within present invention is resins with combined functionalities that target several components at the same time. Often the components removed by such poly-functional resins are regarded as contaminants and therefore the utilized resins are referred to as sacrificial resins (typically not regenerated after use). Poly-functional resins are often used in a sacrificial bed preceding the actual catalyst bed within processes for production of FAME based Biodiesel, for example from non-refined vegetable oils. The sacrificial bed removes various cations and various polymeric entities as proteins, phospholipids, etc. i.e. contaminants that are similar to the targeted CTO contaminants.

In cases when heterogeneous system is chosen for the fatty and resin acid liberation as free carboxylic acids, a preferred process arrangement is fixed bed type processing unit. Thus, the heterogeneous system is packed into the reactor bed and the CTO feed is passed through the active bed producing an oil stream, where the levels of calcium soaps and calcium resinates is substantially decreased relative to the initial CTO and preferably out coming stream is free of calcium soaps and calcium resinates. In more particular the calcium is retained by the heterogeneous bed material and the fatty and resin acids comprising the calcium soaps and calcium resinates are liberated and available for production of SGCTD feedstock stream. The use of a heterogeneous system has the advantage over the acid wash in terms of avoiding the handling of highly corrosive acid stream utilized in the later approach. On the other hand, as a disadvantage for heterogeneous system can be mentioned (i) need for regeneration and/or (ii) disposal considerations for the utilized bed packing material.

Therefore, according to one specific embodiment of the present invention the fatty and resin acids are recovered from the corresponding calcium soaps and calcium resinates by treatment of crude tall oil in a fixed bed reactor containing heterogeneous system selected from acidic clays, minerals, zeolites, acid modified inorganic supports, ion exchange resins, chelating resins, poly-functional resins and mixtures thereof.

After one or more treatment steps addressing the recovery of fatty and resin acids comprising initial calcium soaps and calcium resinates, certain measures have to be taken towards contaminants originating from the entrained black liquor in tall oil soap and thereafter in CTO, namely alkali salts, lignin, fibers and other foreign matter.

These contaminants can be removed in a single step, for example filtration. Especially effective solution within present invention is a filtration with the help of leaf-type filter which retains particles larger than 10 micrometers. Highest efficiency towards contaminant removal was achieved at standard temperatures 20-25 degrees C. At higher temperatures, the efficiency is substantially decreased. The filtration at standard temperatures, however, is characterized with slow filtration speeds. The filtration speeds can substantially be improved by the addition of various filtration aids into CTO feed prior filtration, typical example of such aid is being diatomaceous silica. Thus, the obtained filtrate is characterized with very low contaminant levels less than 50 ppm and preferably less than 5 ppm with respect to salts present within the feed stream. Further, it has been discovered that filtration with filter media which has higher level of permeability (openings retaining particles larger than 10 micrometers) is not effective for the removal of alkali salts such as sodium sulfates. However, the lignin and fibers present in the CTO are essentially removed even in the cases when filter media with coarser opening is used.

The non-oil contaminants with black liquor origin can also be removed by other means such as ultra-filtration and centrifugation. Although these approaches are highly efficient towards removing the non-oil contaminants, they are characterized by high investment coasts and some problems related to availability in a continuous type processes. The problems are mainly due to fouling in case of ultra-filtration and deposits which are difficult to discharge in case of centrifugation.

Within present invention, it is advantageous to perform the non-oil contaminants removal after the recovery of the fatty acid and resin acid portions comprising the calcium soaps and calcium resinates described earlier. The main reason is because any calcium sulfates, calcium phosphates or mixtures formed during the fatty and resin acid recovery will also be removed during any subsequent filtration/centrifugation step.

Therefore, according to one specific embodiment of the present invention, the removal of non-oil contaminants present in the crude tall oil is achieved by filtration at ambient temperature, ultra-filtration, centrifugation or by a combination thereof. According to yet another specific embodiment of the present invention, the filtration, ultra-filtration, centrifugation and combinations of such treatments is performed after the acidic wash step in order to remove generated $CaSO_4$ or $Ca_3(PO_4)_2$ and a mixture thereof.

To sum-up, according to present invention the CTO feed is initially subjected to at least one reaction/purification step selected from acid wash, heterogeneous mono- and/or poly-functional system and filtration/centrifugation to obtain refined tall oil with lignin/fibers content below about 100 ppm and calcium content below about 10 ppm.

Within next step of present invention, the refined tall oil is subjected to at least one separation treatment which removes the tall oil fraction comprised of components with boiling points, at atmospheric pressure, below about 170 degrees C. (in following referred to as tall oil volatiles).

The volatile fraction present within CTO is typically in the range from few tenths of the weight percent to up to 2 wt. % in addition to the 0.5-3 wt. % water entrained within the CTO. The former fraction is comprised of number of components with varying molecular weight, composition (from hydrocarbons to hydrocarbons with varying content of heterogeneous elements such as sulfur, oxygen, nitrogen, etc.) and hence physical properties. However, the common feature of components comprising the tall oil volatile fraction is that they are not desirable within the SGCTD feedstock, which is primary objective of the present invention. Furthermore if remain present in tall oil, the volatiles tend to cause downstream problems within the process described in present invention.

The tall oil volatile content is effectively reduced in a series of heat-exchanger units alternated with expansion vessels in-between and at least one stripping process unit. Thus, the refined tall oil feed is gradually preheated in a series of heat-exchangers up to temperatures of about 200 degrees C., where after each heat-exchanger the oil is allowed to expand and thereby releasing components which are volatile at the present conditions. After the last heat exchanger-expansion vessel sequence the oil feed has reached the lower end of the fraction with boiling points of interest for SGCTD feedstock and the content of the components with lower boiling points (<200 degrees C.) has been substantially decreased. Furthermore, the gradual increase of the tall oil temperature makes the heat-integration of the overall process more flexible by providing streams with wide range of temperatures which can be utilized in most efficient manner.

In order to further reduce the tall oil volatiles and in turn to decrease downstream problems, the preheated oil stream is subjected to treatment in a stripping unit. The stripping unit can be selected out of the two general types i.e. tray type tower or packed-bed type tower. According to one embodiment of the process described in present invention packed-bed tower was selected. Thus, the preheated oil enters at the top of the stripping unit where the stream is distributed by appropriate design and flows downwards of the tower. The oil flow downwards is met in a counter-current fashion by the steam stream (injected at the tower bottom). The large contact area that ensures the maximum contact between the oilsteam streams is provided by internal packing which comprises the major part of the tower internal volume. Thus, the tall oil volatiles are picked-up by the steam stream and move upwards to the tower top where they exit the unit. As the oil stream travels downwards of stripping unit, the content of tall oil volatiles is substantially decreased. Thus described part of the stripping unit operates preferably at atmospheric pressure. In order to remove very last portion of tall oil volatiles, the oil stream exiting the stripper (bottom) is sent to another expansion vessel which is operated at moderate vacuum of about 800 mbar and preferably 500 mbar. Thus flashed tall oil stream which exits the last expansion vessel has volatile levels of about 800 ppm and preferably about 500 ppm. It has to be noted that in addition to volatiles removal, the stream stripping removes to large extend the tall oil odor (mainly due to the presence of volatile sulfur containing components). Further, the choice of steam as vapor fluid for the removal of tall oil volatiles brings additional advantages such as availability and benefits from environmental point of view.

Therefore, according to one specific embodiment of the present invention, the refined tall oil from step a) is preheated in at least one heat-exchanger to at least 170 degrees C. within the step b). According to another specific embodiment of the present invention, the tall oil volatiles present within the refined tall oil are removed in at least one expansion vessel that follows the heat-exchanging unit. According to yet another specific embodiment of the present invention, the tall oil volatiles present within the refined tall oil are removed in at least one stripping unit during step b). Moreover, according to another specific embodiment of the present invention, a possible additional portion of tall oil volatiles present within the refined tall oil is removed in an expansion vessel placed after a stripping unit which is operated at moderate vacuum.

To sum-up, according to present invention the refined tall oil feed is subjected to at least one preheating/flashing/stripping step(s) or combinations thereof to obtain tall oil stream with volatiles content below about 800 ppm and preferably volatiles content below about 500 ppm.

Next process step within the present invention, namely the step after the removal of CTO contaminants and CTO volatiles, is to eliminate the high-boiling point components (boiling points over 400 degrees C.) present in the crude tall oil feed. Achieving sharp fractionation cut is a necessary condition both for the applicability of SGCTD feedstock for production of diesel range fuel compositions and for direct use in diesel engines.

High boiling point components present within the initial CTO and in volatiles-free refined oil are (i) components comprising the unsaponifiable fraction (>C28); (ii) high-molecular weight (500-600 g mol$^{-1}$) esters of steryl- and/or wax-type and (iii) products of Diels-Alder-type intermolecular dimerization reaction. Typical high-boiling point compounds within the CTO unsaponifiables are Campesterol (C28), Stigmasterol and Sitosterol (C29), Squalene, Betulinol, Lupeol (C30), Methyl-Betulinol (C31), etc. Whereas high-boiling point unsaponifiables are naturally present within the CTO, the high-molecular weight esters and Diels-Alder dimerization products are result of unwanted reactions taking place during the CTO handling/storage and/or CTO processing/upgrading. High-molecular weight esters originate from intermolecular reaction between the CTO components with —COOH and —OH groups. Especially prone to this type of unwanted reactions (since they decrease content of valuable tall oil components) are free fatty acids due to the accessible carboxylic group at primary C-atom (in contrast the carboxylic group within resin acids is at quaternary C-atom). Thus, the tall oil free fatty acids relatively easy react with sterol-type and/or fatty alcohol-type unsaponifiables to form the corresponding steryl esters and wax esters, respectively. Diels-Alder type dimerization products concern components with double bonds which are initially non-conjugated such as crude tall oil free fatty acids. However, upon heating and in the presence of certain salts, clays, etc. the double bonds often migrate to give the corresponding conjugated isomers which in turn may react with isolated double bond from another molecule thus forming common cyclic structure. The non-oil contaminants present in CTO (discussed earlier in this description) can promote the initial double bond migration within Diels-Alder dimerization. This once again emphasizes the importance of applying highly efficient processing steps aiming at the removal of those contaminants.

The high-boiling point components comprising CTO (>400 degrees C.) are efficiently separated in a packed bed column operating at vacuum conditions (1-25 mbar) and temperature in the range 150-280 degrees C. The column design is optimized according to following objectives: (i) maximum yield of fraction with boiling points in the temperature range of 170-400 degrees C.; (ii) very sharp fractionation cut at about 400 degrees C. and (iii) minimum unwanted reactions.

The packed column comprise of one or more beds of structured packing, a reboiler arrangement in the bottom part of the column and preferably a reflux arrangement in the top part of the column.

Modern structured packing typically consists of thin corrugated metal plates or gauzes arranged in appropriate fashion where the general purpose of each particular design is to force the fluids pumped into the column to follow these long pre-designed paths thereby providing a large surface area which ensures maximum contact between the fluids. The height of the structured bed is closely related to the desired fractionation degree i.e. the number of theoretical stages needed in order to achieve certain level of fractionation. Thus, the height of the primary structured packing utilized within present invention is tailored to the desired fractionation degree which to recall was maximum yield of tall oil components with boiling point range of 170-400 degrees C. Furthermore, it is tailored to ensure the sharp cut for components boiling at about 400 degrees C. such as components within unsaponifiable fraction (C28-C32) which are left in the bottom heavy fraction. Thus, the product SGCTD stream is collected at position just above the primary structured bed.

Therefore according to one specific embodiment of the present invention, the separation in step c) is achieved in a packed bed vacuum distillation column comprised of at least one structured packing.

A typical approach to further sharpen the fractionation cut on its upper end (end of allowed boiling point temperatures) is to use reflux arrangement at the column top which operates in the temperature range 150-220 degrees C. Within the reflux approach, typically a large portion of product is returned into the column in position near the top end. Generally, higher reflux ratio results into the sharper distillation cut. Advantageously, another structural packing is installed just below the incoming reflux stream. Thus, the packing (i) evenly redistributes the relatively cold reflux stream and (ii) ensures the availability of large surface area which in turn maximizes the reflux effect.

Therefore according to one specific embodiment of the present invention, the distillation column for the separation in step c) is equipped with a reflux configuration near the column top end. According to another specific embodiment of the present invention, the high end sharpness of the stream comprised of components with boiling points, at atmospheric pressure, of 170-400 degrees C. is improved by the selection of a suitable reflux ratio. Moreover, according to yet another specific embodiment of the present invention, the homogeneity of the reflux stream entering back to a column within step c) is achieved by auxiliary structured packing.

In order to achieve effective separation, however, a homogeneous fluid flow throughout the column should also be ensured. When homogeneous fluid flow is realized, the components which are liquid at the present conditions are preferably as fine droplets on packing surface, whereas components that are boiling move as vapors. As it was mentioned earlier, the homogeneous flow is often achieved by appropriate distributors and/or structured packing. In order to achieve homogeneous flow upwards, another structured packing can be advantageously installed in position below relative to the primary packing described above. Since it is relatively close to the column bottom this packing may have additional function to separate most of the very heavy components such as steryl- and wax-type esters as well as Diels-Alder dimerization products.

Therefore according to one specific embodiment of the present invention, the re-boiled stream entering back the column for step c) is homogenized and partially fractionated by auxiliary structured packing installed below at least one primary structured packing.

Although superior relative to tray-type distillation columns, the packed bed columns also show certain pressure drop. Utilizing specially designed structured packing the achieved pressure drop within the column top and bottom is below 15 mbar, preferably 10 mbar and most preferred 5 mbar.

The heat and corresponding vapors are supplied to the column via unique reboiler arrangement comprised of forced circulation heat exchanging part and thin film evaporator part (TFE). The bottom part of the column is operated in the temperature range 220-280 degrees C. and preferably in the range 220-260 degrees C.

At least one high throughput forced circulation-type heat exchanger is utilized to deliver most of the heat necessary for the column operation. Thus, a liquid stream from the bottom of column is pumped with very high flow rates through a tubular heat exchange unit. Thus, the required heat effect is transferred to the bottom oil stream which it is returned into the column at point near the beginning of the primary structured packing. When the pre-heated stream enters the column, flashes and the obtained vapors depart upwards relative to the column, whereas the non-vaporized fraction returns at the column bottom. The thin-film evaporator part of the reboiler operates at the same temperature as the forced circulation part. The TFE part has the objective to separate the non-volatile tall oil fraction. By the non-volatile fraction in here it is referred to as the fraction enriched in components with boiling points higher than about 400 degrees C. The evaporated portion of the stream entering the TFE unit is returned into the column for further fractionation whereas the non-volatile components exit as by-product stream of the process described by the present invention.

There are several advantages in using this combined reboiler arrangement: (i) higher efficiency for the heat transfer; (ii) increased availability of the unit and therefore the column (especially important for year around continuous processes); (iii) lower investment cost (TFE unit is typically very costly); (iv) significantly decreased retention time of the oil within the reboiler part which substantially decreases the level of unwanted reactions (high molecular weight esters and condensation products) and hence increases the distillate yield; etc.

Therefore according to one specific embodiment of the present invention, the distillation column for separation in step c) is equipped with a reboiler configuration near its column bottom end. According to another specific embodiment of the present invention, the reboiler part of the distillation column for step c) is comprised of at least one forced circulation heat exchanger and at least one thin-film evaporator. According to yet another specific embodiment of the present invention, the temperature profile of the distillation column for separation in step c) is controlled by management of a forced circulation heat exchanging part of the reboiler. Moreover according to yet another specific embodiment of the present invention, the second stream comprised of components with boiling points over 400 degrees C. is removed from the distillation column through a thin-film evaporator part of the reboiler.

Utilizing packed bed distillation column equipped with unique reboiler and reflux loops, the refined tall oil feed is separated into main stream comprised of components with boiling points, at atmospheric pressure, of about 170-400 degrees C. and by-product stream comprised of non-volatile tall oil fraction. The main stream obtained after fractionation is the SGCTD feedstock subject of the present invention.

Therefore according to one specific embodiment of the present invention the volatiles free tall oil stream is fractionated by distillation into two separate streams or phases, wherein one first stream or phase is comprised of components with boiling points, at atmospheric pressure, of 170-400 degrees C. and one second stream or phase is comprised of components with boiling points, at atmospheric pressure, of over 400 degrees C.

The removal of tall oil components with boiling points over about 400 degrees C. is possible to achieve when only TFE unit is utilized instead of distillation column. However, the sharpness of the cut may be compromised since there is no rectification involved. Within the TFE unit, the feed is whipped as a thin film on a pre-heated surface where the evaporated material is allowed to travel very short distance to a relatively cold surface where it condenses. The short distance for the vapors and the moving parts ensuring the film thickness greatly increase the probability for transfer of unwanted species/components into the product. This transfer-type is of more mechanical type rather than result of realized evaporation-condensation equilibrium stages. Such transfer of unwanted species/components makes the product stream not suitable for use as feedstock in the production of diesel range fuel compositions. It should be noted that even if problem free operation of TFE unit within tall oil fractionation process is achieved, the obtained fractionation product corresponds to only one equilibrium stage which is fairly insufficient to meet the stringent specifications towards SGCTD feedstock. In comparison within the distillation column several equilibrium stages are realized before collecting the product.

Optionally, the SGCTD feedstock is transferred to an additional processing stage, where the oxygen content is greatly decreased via decarboxylation and/or decarbonylation reaction pathways. The deoxygenation stage is operating at a temperature in the range of 150-350 degrees C. and could be designed and performed in fixed bed rector with one or more catalytic beds. The decarboxylation and decarbonylation reactions are promoted by suitable catalysts. Typical decarboxylation/decarbonylation catalysts include activated (acidic) alumina, zirconia, etc., Fuller earths, carbonate based catalysts and transition metal catalysts. Among transition metal catalysts standard sulfur tolerant hydrotreating catalysts such as NiMo/Al2O3 may be used.

Platinum and palladium based catalysts, typically on carbon supports, are other examples for catalytic systems utilized within the deoxygenation of vegetable oils. A major drawback for these catalysts is their sensitivity to sulfur, which may cause rapid deactivation in case of processing SGCTD feedstock, since it still contains substantial amount of sulfur. Therefore, other sulfur tolerant transition metal catalysts should be used to support the decarboxylation of SGCTD feed rather than Pt and Pd supported catalysts. Bimetallic catalytic systems may be utilized where the active sites are comprised of one transition metal active towards deoxygenation reactions and one transition metal which enhances the sulfur tolerance of the system.

The fact that alkali and/or alkali earth salts of carboxylic acids readily decarboxylate upon heating can be used for the design of another catalytic system active in the oxygen depletion of SGCTD feed. Alkali and alkali earth exchanged zeolites and other porous materials with ion exchange properties are such systems. The advantage of using these catalyst systems lies in the fact that these materials act as nano-reactors where several reactions take place: (i) adsorption of carboxylic acid and reaching the catalytic centre; (ii) in-situ formation of the corresponding alkali and/or alkali earth carboxylate (at the active center); (iii) subsequent decarboxylation/decarbonylation and (iv) desorption/diffusion out of the reaction products alkanes and carbon dioxide and/or carbon monoxide thus leaving the active centre available for the next oxygen enriched component.

Therefore in accordance with one specific embodiment of the present invention the deoxygenation of SGCTD feedstock is affected at elevated temperatures of 150-350 degrees C. According to yet another specific embodiment of the present invention, at least one catalyst is used in step d) to promote deoxygenation and in that said at least one catalyst is chosen from the group consisting of activated alumina, zirconia, Fuller earths, alkali and alkali-earth carbonates, supported transition metals, zeolites, alkali and alkali-earth exchanged zeolite catalysts and mixtures thereof.

The deoxygenation reactions are endothermic and hence optionally hydrogen may be injected during deoxygenation to provide heat from exothermal hydrogenation reactions, for example double bond saturation. Diterpenic acids, fatty acids are depleted in oxygen at least partially during the decarboxylation reactions thus saving hydrogen needed for a following hydrotreating stage. Hydrogen consumption is thereby decreased from around 2-4% by weight on SGCTD oxygenated feedstock to less than 1% on the SGCTD oxygen depleted feedstock.

Therefore in accordance with one specific embodiment of the present invention the deoxygenation in step d) is affected at elevated temperatures of 150-350 degrees C. in the presence of hydrogen gas The fate of the sulfur contaminant within CTO has not been considered in detail by the description of the present invention. Large portion of the sulfur is removed during the tall oil volatiles stripping. Further, certain amount of sulfur remains within the non-volatile by-product fraction. Additional sulfur portion, however, follows the SGCTD stream in amounts of about 500 ppm. It is acknowledged that this portion of sulfur has organic nature and does not cause any problems within the SGCTD processing in typical hydrotreating unit. Furthermore, the hydrogenation catalysts are often combined with catalysts having hydrodesulfurization catalysts which in turn need certain level of sulfur within the feed in order to operate efficiently. In other words, the SGCTD feedstock carries in self the sulfur quantities necessary for the normal operation of selected catalytic systems used to convert the SGCTD into diesel range fuel components.

Hydrogenation/hydrodesulphurization of the SGCTD feedstock in a hydroprocessing plant is performed on the SGCTD feedstock alone or in combination with vegetable oils and/or animal oils and/or mineral oil fractions in the presence of hydrogen gas at a temperature in the range of 320-450 degrees C. The hydrogen treatment is performed in the presence of at least one catalyst. It is particularly advantageous to perform the hydrogenation reactions in standard petroleum refinery hydrotreaters.

Therefore according to one specific embodiment of the method according to the present invention, the oxygen depleted stream or phase obtained in step d) is further treated over a catalyst system comprising at least one hydrogenation and desulphurization catalysts to obtain low sulfur diesel range fuel composition.

The invention claimed is:
1. Method for conversion of crude tall oil into a renewable diesel fuel composition by a sequence of reaction and separation steps wherein the method comprises the steps of:

a) removal of non-oil contaminants present in the crude tall oil and recovering valuable organic compounds present in the crude tall oil, thereby forming a refined tall oil stream;
b) removal of the volatile fraction of the refined tall oil stream from step a), thereby forming a volatiles free oil stream comprising organic components with boiling points, at atmospheric pressure, of 170° C. or higher;
c) separation in a vacuum distillation system, said system comprising a vacuum distillation column and a thin-film evaporator, of the volatiles free oil stream of step b) into at least two process streams or phases wherein a first process stream or phase is substantially comprising components with boiling points, at atmospheric pressure, in the range of 170-400° C. and a second process stream or phase is substantially comprising components with boiling points, at atmospheric pressure, over 400° C.;
d) directly or indirectly passing components from the first process stream or phase of step c) through a catalytic bed comprising a deoxygenation catalyst at elevated temperature, thereby forming a diesel range fuel depleted in oxygen.

2. Method for conversion of crude tall oil into a renewable diesel fuel composition by a sequence of separation steps wherein the method comprises the steps of:
b) removal of non-oil contaminants including the volatile fraction present in the crude tall oil, thereby forming a volatiles free oil stream comprising organic components with boiling points, at atmospheric pressure, of 170° C. or higher;
c) separation in a vacuum distillation system, said system comprising a vacuum distillation column and a thin-film evaporator, of the volatiles free oil stream of step b) into at least two process streams or phases wherein a first process stream or phase is substantially comprising components with boiling points, at atmospheric pressure, in the range of 170-400° C. and a second process stream or phase is substantially comprising components with boiling points, at atmospheric pressure, over 400° C.;
d) directly or indirectly passing components from the first process stream or phase of step c) through a catalytic bed comprising a deoxygenation catalyst at elevated temperature, thereby forming a diesel range fuel depleted in oxygen.

3. Method according to claim 1 or 2, wherein in step c) the first process stream or phase substantially comprising components with boiling points, at atmospheric pressure, in the range of 170-400° C. is discharged from the vacuum distillation column and the second process stream or phase substantially comprising components with boiling points, at atmospheric pressure, over 400° C. is discharged from the thin-film evaporator.

4. Method according to claim 1, wherein the vacuum distillation column in step c) is connected to, or the vacuum distillation system in step c) comprises, a reboiler arrangement comprising one or more reboilers which reboilers supplies heat for distillation in the vacuum distillation column and heat for vaporization of tall oil components in the thin film evaporator.

5. Method according to claim 1, wherein step a) is achieved by washing crude tall oil with sulfuric acid, phosphoric acid or a mixture thereof.

6. Method according to claim 1, wherein step a) is achieved by treatment of crude tall oil in a fixed bed reactor containing heterogeneous system selected from acidic clays, minerals, zeolites, acid modified inorganic supports, ion exchange resins, chelating resins, poly-functional resins and mixtures thereof.

7. Method according to claim 1, wherein step a) is achieved by filtration of crude tall oil, ultra-filtration, centrifugation or a combination thereof.

8. Method according to claim 1, wherein volatiles including water is removed from the tall oil in step b) by a heating and flashing arrangement.

9. Method according to claim 1, wherein the tall oil volatiles present within the refined tall oil are removed in at least one expansion vessel that follows a heat-exchanging unit.

10. Method according to claim 1, wherein the tall oil volatiles present within the refined tall oil are removed in at least one stripping unit during step b).

11. Method according to claim 1, wherein tall oil volatiles in step b) are removed in a vessel operated at moderate vacuum, preferably in the range of 500-800 mbar.

12. Method according to claim 1, wherein a vacuum distillation column comprises a bed of at least one structured packing.

13. Method according to claim 1, wherein a distillation column for the separation in step c) is equipped with a reflux configuration near its column top end.

14. Method according to claim 1, wherein the high end sharpness of the stream comprised of components with boiling points 170-400° C. is improved by the selection of a suitable reflux ratio.

15. Method according to claim 1, wherein the homogeneity of the reflux stream entering back to a column within step c) is achieved by auxiliary structured packing.

16. Method according to claim 1, wherein a distillation column for separation in step c) is equipped with a reboiler arrangement near its column bottom end.

17. Method according to claim 1, wherein the temperature profile of the distillation column for separation in step c) is controlled by management of a forced circulation heat exchanging.

18. Method according to claim 1, wherein deoxygenation in step d) is effected at elevated temperatures of 150-350° C.

19. Method according to claim 1, wherein deoxygenation in step d) is performed in the presence of hydrogen gas in a petroleum refinery.

20. Method according to claim 1, wherein deoxygenation in step d) is effected at elevated temperatures of 150-350° C. in the presence of hydrogen gas.

21. Method according to claim 1, wherein at least one catalyst is used in step d) to promote deoxygenation and in that said at least one catalyst is chosen from the group consisting of activated alumina, zirconia, Fuller earths, alkali and alkali-earth carbonates, supported transition metals, zeolites, alkali and alkali-earth exchanged zeolite catalysts and mixtures thereof.

22. Method according to claim 1, wherein an oxygen depleted stream or phase obtained in step d) is further treated over a catalyst system comprising at least one hydrogenation and desulphurization catalyst to obtain low sulfur diesel range automotive fuel composition.

23. Method for conversion of crude tall oil into a renewable diesel fuel composition by a sequence of reaction and separation steps comprising the steps of:
a) removal of non-oil contaminants present in the crude tall oil and recovering valuable organic compounds present in the crude tall oil, thereby forming a refined tall oil stream;
b) removal of the volatile fraction of the refined tall oil stream from step a), thereby forming a volatiles free oil stream comprising organic components with boiling points, at atmospheric pressure, of 170° C. or higher;

c) separation in a vacuum distillation column of the volatiles free oil stream of step b) into two process streams or phases wherein a first process stream or phase is substantially comprising components with boiling points, at atmospheric pressure, in the range of 170-400° C. and a second process stream or phase is substantially comprising components with boiling points, at atmospheric pressure, over 400° C.;

d) passing the first process stream or phase substantially comprising components with boiling points, at atmospheric pressure, in the range of 170-400° C. through a catalytic bed comprised of deoxygenation catalyst at elevated temperature, thereby forming a diesel range fuel depleted in oxygen.

* * * * *